United States Patent
Wang et al.

(10) Patent No.: US 7,239,171 B1
(45) Date of Patent: Jul. 3, 2007

(54) TECHNIQUES FOR PROVIDING MULTIPLE TERMINATION IMPEDANCE VALUES TO PINS ON AN INTEGRATED CIRCUIT

(75) Inventors: Xiaobao Wang, Cupertino, CA (US); Chiakang Sung, Milpitas, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 10/798,597

(22) Filed: Mar. 10, 2004

Related U.S. Application Data

(63) Continuation-in-part of application No. 10/044,365, filed on Jan. 11, 2002, now Pat. No. 6,798,237.

(60) Provisional application No. 60/315,965, filed on Aug. 29, 2001.

(51) Int. Cl.
*H03K 17/16* (2006.01)
*H03K 19/03* (2006.01)

(52) U.S. Cl. .......................... 326/30; 326/83

(58) Field of Classification Search ................ 326/30, 326/82, 83, 86
See application file for complete search history.

(56) References Cited

U.S. PATENT DOCUMENTS

| | | | |
|---|---|---|---|
| 4,719,369 A | 1/1988 | Asano et al. | |
| 4,954,729 A | 9/1990 | Urai | |
| 5,111,081 A | 5/1992 | Atallah | |
| 5,134,311 A | 7/1992 | Biber et al. | |
| 5,164,663 A | 11/1992 | Alcorn | |
| 5,179,300 A | 1/1993 | Rolandi et al. | |
| 5,359,235 A | 10/1994 | Coyle et al. | |
| 5,374,861 A | 12/1994 | Kubista | |
| 5,592,510 A | 1/1997 | Van Brunt et al. | |
| 5,602,494 A | 2/1997 | Sundstrom | |
| 5,623,216 A | 4/1997 | Penza et al. | |
| 5,656,953 A | 8/1997 | Whetsel | |
| 5,721,548 A | 2/1998 | Choe et al. | |
| 5,726,582 A | 3/1998 | Hedberg | |
| 5,726,583 A | 3/1998 | Kaplinsky | |
| 5,764,080 A | 6/1998 | Huang et al. | |
| 5,864,715 A | 1/1999 | Zani et al. | |
| 5,939,896 A | 8/1999 | Hedberg | |

(Continued)

OTHER PUBLICATIONS

"Apex 20K Programmable Logic Device Family, " product data sheet version 3.7, May 2001 Altera Corporation San Jose, CA (2001). pp. 1-8, pp. 37-47

(Continued)

*Primary Examiner*—Daniel Chang
(74) *Attorney, Agent, or Firm*—Townsend and Townsend and Crew LLP

(57) ABSTRACT

Techniques are provided for matching the characteristic impedance of different transmission lines coupled to I/O pins on an integrated circuit. On-chip termination impedance circuitry can generate different termination impedance values for each I/O pin. Each termination impedance value is selected to match the characteristic impedance of the transmission line coupled to a particular I/O pin. The termination impedance can be set in response to the value of an off-chip resistor. Bit shifter circuitry can change the termination impedance provided to individual I/O pins. The bit shifter circuitry can increase or decrease the termination impedance at any of the I/O pins without changing the value of the off-chip resistor.

22 Claims, 9 Drawing Sheets

U.S. PATENT DOCUMENTS

| | | | |
|---|---|---|---|
| 5,955,894 A * | 9/1999 | Vishwanthaiah et al. | 326/86 |
| 5,955,911 A | 9/1999 | Drost et al. | |
| 5,970,255 A | 10/1999 | Tran et al. | |
| 6,008,665 A | 12/1999 | Kalb et al. | |
| 6,020,760 A | 2/2000 | Sample et al. | |
| 6,026,456 A | 2/2000 | Ilkbahar | |
| 6,037,798 A | 3/2000 | Hedberg | |
| 6,049,255 A | 4/2000 | Hagberg et al. | |
| 6,064,224 A | 5/2000 | Esch, Jr. et al. | |
| 6,087,847 A | 7/2000 | Mooney et al. | |
| 6,097,208 A | 8/2000 | Okajima et al. | |
| 6,100,713 A | 8/2000 | Kalb et al. | |
| 6,118,310 A | 9/2000 | Esch, Jr. | |
| 6,147,520 A | 11/2000 | Kothandaraman et al. | |
| 6,154,060 A | 11/2000 | Morriss | |
| 6,157,206 A | 12/2000 | Taylor et al. | |
| 6,181,157 B1 | 1/2001 | Fiedler | |
| 6,236,231 B1 | 5/2001 | Nguyen et al. | |
| 6,252,419 B1 | 6/2001 | Sung et al. | |
| 6,329,836 B1 | 12/2001 | Drost et al. | |
| 6,356,106 B1 | 3/2002 | Greeff et al. | |
| 6,362,644 B1 | 3/2002 | Jeffery et al. | |
| 6,366,128 B1 | 4/2002 | Ghia et al. | |
| 6,411,126 B1 | 6/2002 | Tinsley et al. | |
| 6,414,512 B1 | 7/2002 | Moyer | |
| 6,424,169 B1 | 7/2002 | Partow et al. | |
| 6,433,579 B1 | 8/2002 | Wang et al. | |
| 6,445,245 B1 | 9/2002 | Schultz et al. | |
| 6,445,316 B1 * | 9/2002 | Hsu et al. | 341/120 |
| 6,448,813 B2 | 9/2002 | Garlepp et al. | |
| 6,466,063 B2 | 10/2002 | Chen | |
| 6,489,837 B2 | 12/2002 | Schultz et al. | |
| 6,504,397 B1 | 1/2003 | Hart et al. | |
| 6,529,037 B1 * | 3/2003 | Haycock et al. | 326/30 |
| 6,586,964 B1 | 7/2003 | Kent et al. | |
| 6,590,413 B1 | 7/2003 | Yang | |
| 6,603,329 B1 | 8/2003 | Wang et al. | |
| 6,605,958 B2 | 8/2003 | Bergman et al. | |
| 6,639,397 B2 | 10/2003 | Roth et al. | |
| 6,642,741 B2 | 11/2003 | Metz et al. | |
| 6,683,482 B2 | 1/2004 | Humphrey et al. | |
| 6,700,823 B1 | 3/2004 | Rahman et al. | |
| 6,710,618 B1 | 3/2004 | Murray | |
| 6,747,475 B2 | 6/2004 | Yuffe et al. | |
| 6,766,155 B2 | 7/2004 | Salcido et al. | |
| 6,788,101 B1 | 9/2004 | Rahman | |
| 2002/0010853 A1 | 1/2002 | Trimberger et al | |
| 2002/0060602 A1 | 5/2002 | Ghia et al | |
| 2002/0101278 A1 | 8/2002 | Schultz et al | |
| 2003/0062922 A1 | 4/2003 | Douglass et al | |
| 2004/0008054 A1 | 1/2004 | Lesea et al | |

OTHER PUBLICATIONS

"Apex II Programmable Logic Device Family," product data sheet version 1.1, May 2001 Altera Corporation San Jose, CA (2001). pp. 1-8, pp. 38-59.

"Virtex-II 1.5V Field Programmable Gate Arrays," product specifications DSO3102 (v1.5) Apr. 2, 2001., Xilinx, Inc., San Jose, CA (2001), pp. 1-36.

Bendak et al. "CMOS VLSI Implementation of Gigabyte/second computer network links," proceedings of the IEEE International Symposium on Circuits and Systems '96, pp. 269-272 (1996).

Boni et al. "LVDS I/O Interface for Gb/s-per-Pin Operation in 0.35-um CMOS," IEEE Journal of Solid-State Circuits, 36:706-711 (2001).

Esch et al. "Theory and Design of CMOS HSTL I/O Pads," The Hewlett Packard Journal (1998), pp. 46-52.

"Spartan-3 1.2V FPGA Family: Functional Description, CA DS099-2 (v1.2)," product specifications Xilinx, Inc., San Jose (Jul. 11, 2003), pp. 1-9.

"Virtex-II Platform FPGAs: Detailed Description, DS031-2 (v3.1)," product specifications Xilinx, Inc., San Jose, CA (Oct. 14, 2003), pp. 1-23.

"Virtex-II Pro Platform FPGAs: Functional Description, DS083-2 (V2.9)," product specifications Xilinx, Inc., San Jose, CA, (Oct. 14, 2003), pp. 1-11.

* cited by examiner

TECHNIQUES FOR PROVIDING MULTIPLE TERMINATION IMPEDANCE VALUES TO PINS ON AN INTEGRATED CIRCUIT

CROSS-REFERENCES TO RELATED APPLICATIONS

This patent application is a continuation-in-part of U.S. patent application Ser. No. 10/044,365, now U.S. Pat. No. 6,798,237, filed Jan. 11, 2002, which claims the benefit of U.S. provisional application 60/315,965, filed Aug. 29, 2001, both of which are incorporated by reference herein.

BACKGROUND OF THE INVENTION

The present invention relates to techniques for providing multiple on-chip termination impedance values to pins on an integrated circuit, and more particularly, to techniques for providing different termination impedance values to different pins on an integrated circuit using by shifting digital bit signals.

Prior art integrated circuits have off-chip termination resistors. An off-chip termination resistor is coupled to each input/output (I/O) pin of an integrated circuit to provide termination impedance. The impedance of each off-chip resistor matches the impedance of a transmission line coupled to the pin to reduce signal reflection.

Some integrated circuit have hundreds of I/O pins that require impedance matching circuitry. In these integrated circuits, a separate impedance matching resistor must be coupled to each of the I/O pins. Hundreds of impedance matching resistors must be coupled to such an integrated circuit to provide adequate impedance matching. Thus, prior art off-chip impedance matching resistors substantially increase the amount of board space required.

Other prior art integrated circuits have provided on-chip impedance termination techniques. However, these on-chip impedance termination techniques provide the same impedance termination values to one or more I/O pins on the integrated circuit.

Different I/O pins on an integrated circuit are typically coupled to different transmission lines that have different characteristic impedance values. Providing the same impedance termination values at each pin does not produce the right impedance matching values that are needed to reduce signal reflection on all of the transmission lines. Therefore, it would be desirable to have circuitry that can match the characteristic impedance of transmission lines with different characteristic impedance values without requiring numerous off-chip resistors.

BRIEF SUMMARY OF THE INVENTION

The present invention provides techniques for matching the characteristic impedance of different transmission lines coupled to multiple I/O pins on an integrated circuit. Circuitry of the present invention can generate different termination impedance values for each I/O pin. Each termination impedance value can be selected to match the characteristic impedance of the transmission line coupled to a particular I/O pin. The termination impedance can be set in response to the value of one off-chip resistor.

The present invention also includes bit shifter circuits that can change the termination resistance provided to the I/O pins. The bit shifter circuits can increase or decrease the termination impedance at the I/O pins without changing the value of the off-chip resistor.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1A:
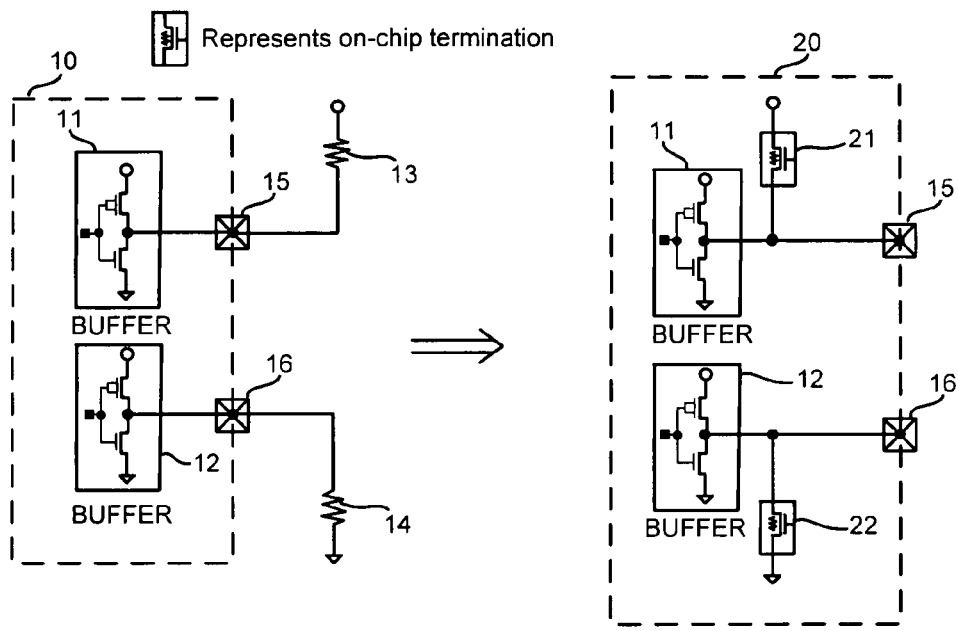
FIGS. 1A-1C are schematic diagrams illustrating various integrated circuits that have on-chip impedance matching circuits, in accordance with the present invention.
Figure 1B:
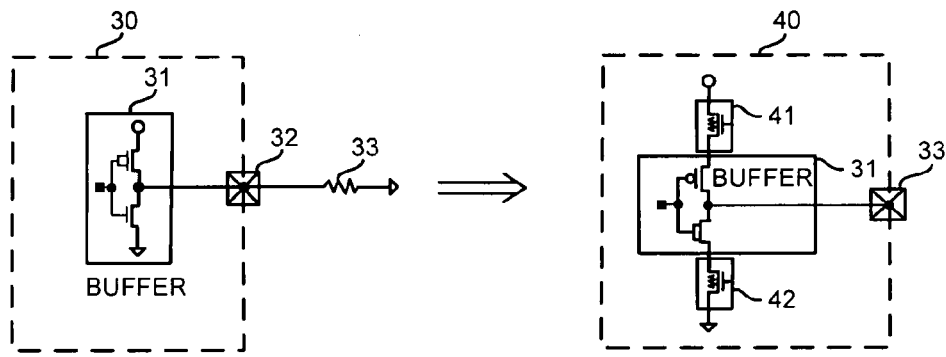
Figure 1C:
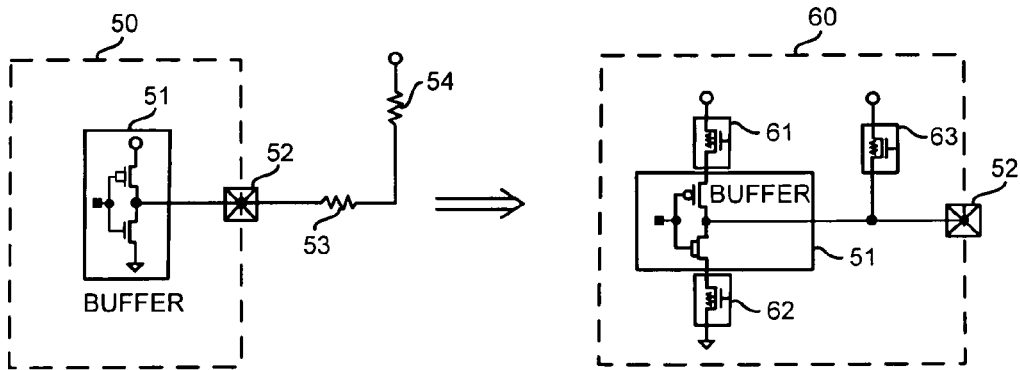

Three embodiments of on-chip impedance matching circuits of the present invention are illustrated in FIGS. 1A-1C. An integrated circuit 10 shown in FIG. 1A includes buffers 11 and 12, which each have outputs coupled to input/output (I/O) pins 15 and 16, respectively. Buffers 11 and 12 buffer signals received at and transmitted to pins 15 and 16. Each of buffers 11 and 12 includes an inverter. The inverters each have a p-channel and an n-channel field-effect transistors coupled in series between a power supply and ground. Integrated circuit 10 may be, for example, a programmable logic device, an application specific integrated circuit (ASIC), a memory circuit, or a microprocessor.

In prior art circuits, off-chip resistors 13 and 14 are used to provide impedance matching at pins 15 and 16, respectively. Resistor 13 is coupled between pin 15 and a supply voltage in parallel with a first signal line. Resistor 14 is coupled between pin 16 and ground in parallel with a second signal line.

Using techniques of the present invention, off-chip resistors 13 and 14 can be replaced with on-chip impedance matching circuits 21 and 22, respectively. Impedance matching circuit 21 is coupled between pin 15 and a power supply inside integrated circuit 20 as shown in FIG. 1A. Impedance matching circuit 22 is coupled between pin 16 and ground inside integrated circuit 20 as shown in FIG. 1A. Impedance matching circuits 21 and 22 are coupled in parallel with signal lines that are coupled to pins 15 and 16, respectively.

Impedance matching circuits 21 and 22 reduce the reflection of signals on signal lines that are coupled to pins 15 and 16, respectively. Further details of on-chip impedance matching circuits are discussed below.

An integrated circuit 30 shown in FIG. 1B includes buffer circuit 31, which is coupled to I/O pin 32. Buffer circuit 31 also includes a p-channel and an n-channel field-effect transistors coupled between a supply voltage and ground. In prior art circuits, off-chip resistor 33 is used to provide impedance matching. Resistor 33 is coupled in series between pin 32 and a signal line.

Using techniques of the present invention, off-chip resistor 33 can be replaced with on-chip impedance matching circuits 41 and 42. Impedance matching circuit 41 is coupled between an on-chip power supply source and buffer circuit 31 in integrated circuit 40. Impedance matching circuit 42 is coupled between ground and buffer circuit 31 in integrated circuit 40. Impedance matching circuit 41 is coupled in series with a signal line coupled to pin 33 when the p-channel transistor of buffer 31 is ON. Impedance matching circuit 42 is coupled in series with a signal line coupled to pin 33 when the n-channel transistor of buffer 31 is ON. Impedance matching circuits 41 and 42 reduce the reflection of signals on a signal line coupled to pin 33.

An integrated circuit 50 shown in FIG. 1C includes buffer circuit 51, which is coupled to I/O pin 52. Buffer circuit 51 also includes a p-channel and an n-channel field-effect transistors coupled between a supply voltage and ground. In prior art circuits, off-chip resistors 53 and 54 are used to provide impedance matching. Resistor 53 is coupled in series between pin 52 and a signal line. Resistor 54 is coupled in parallel between the signal line and a supply voltage.

Using techniques of the present invention, off-chip resistors 53 and 54 can be replaced with on-chip impedance matching circuits 61-63. Impedance matching circuit 63 is coupled between pin 52 and a supply voltage. On-chip impedance matching circuit 63 replaces resistor 54. Impedance matching circuit 61 is coupled between a supply voltage and buffer 51, and impedance matching circuit 62 is coupled between buffer 51 and ground. On-chip impedance matching circuits 61-62 replace resistor 53.

Figure 2:
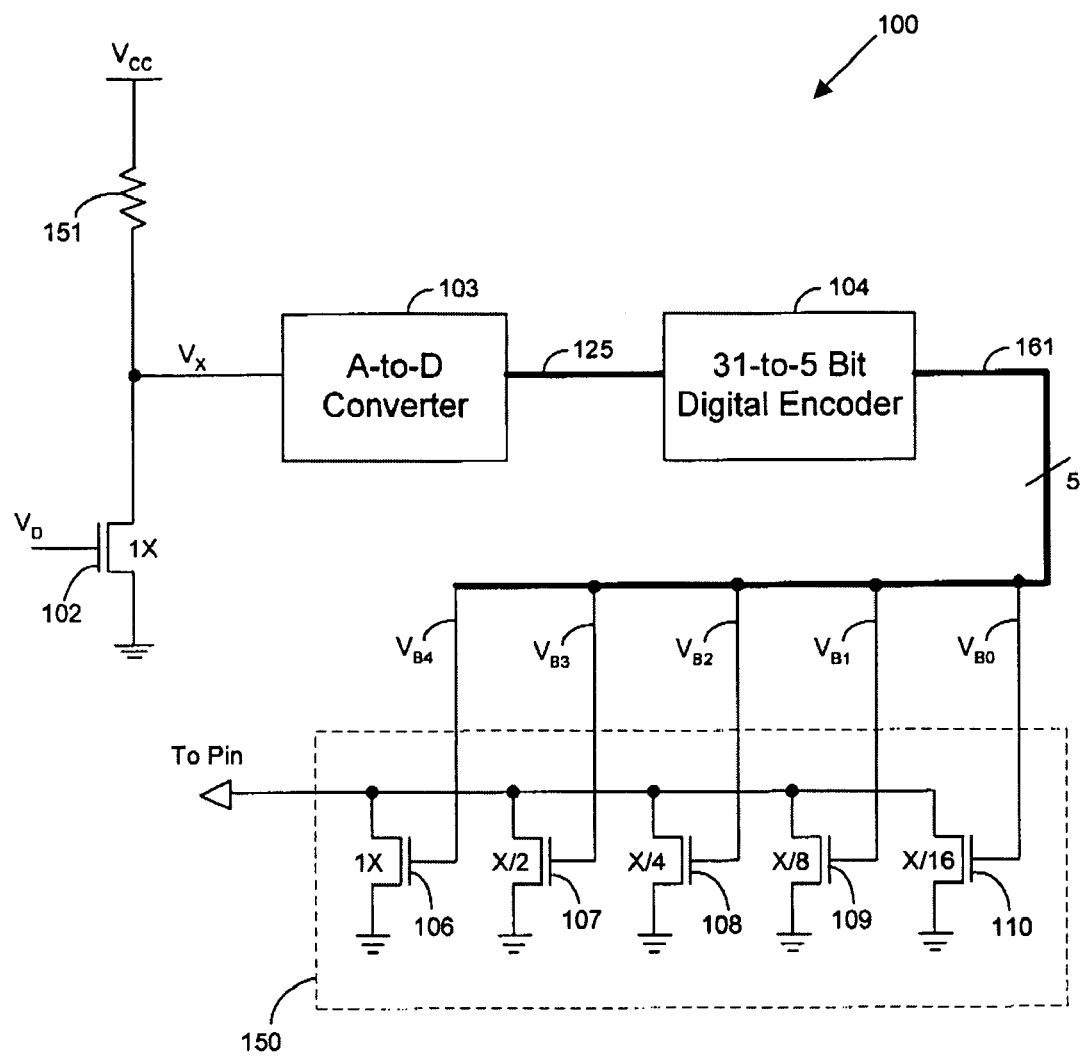
FIG. 2 is a diagram illustrating an embodiment of an on-chip impedance matching circuit, in accordance with the present invention.

FIG. 2 illustrates an embodiment of an on-chip impedance matching circuit of the present invention. Impedance control circuit 100 includes reference resistor 151, field effect transistor (FET) 102, analog-to-digital converter 103, digital encoder circuit 104, and on-chip impedance matching circuit 150. Reference resistor 151 is coupled between a supply voltage $V_{CC}$ and an input to analog-to-digital converter 103. Transistor 102 is coupled between the input of analog-to-digital converter 103 and ground. The gate terminal of transistor 102 is coupled to voltage source $V_D$. Voltage source $V_D$ controls the current through transistor 102 and the resistance between the drain and the source of transistor 102 ($R_{DS}$) when transistor 102 is ON. Transistor 102 may operate in the linear region or in the saturation region.

Reference resistor 151 can be an off-chip resistor that is coupled to a pin of the integrated circuit. Resistor 151 can be a precision resistor. Resistor 151 can also be an on-chip resistor.

Transistor 102 is an on-chip transistor. The ON resistance ($R_{DS}$) of on-chip transistor 151 varies with the temperature of the integrated circuit, the process techniques used to fabricate the integrated circuit, and variations in the supply voltage $V_{CC}$ and voltage source $V_D$.

Reference resistor 151 and transistor 102 form a voltage divider that has a voltage output signal $V_X$. $V_X$ is proportional to the resistance ratio of resistor 151 and the $R_{DS}$ of transistor 102 according to the following equation:

$$V_X = V_{CC} \frac{R_{DS}}{R_{DS} + R_{101}} \quad (1)$$

The voltage output signal $V_X$ is indicative of the resistance ($R_{DS}$) of transistor 102 and the resistance R151 of resistor 151. Voltage output signal $V_X$ varies as the resistance of transistor 102 changes with variations in chip process, temperature, and voltage. Voltage output signal $V_X$ is provided to an input of analog-to-digital converter 103.

Figure 3:
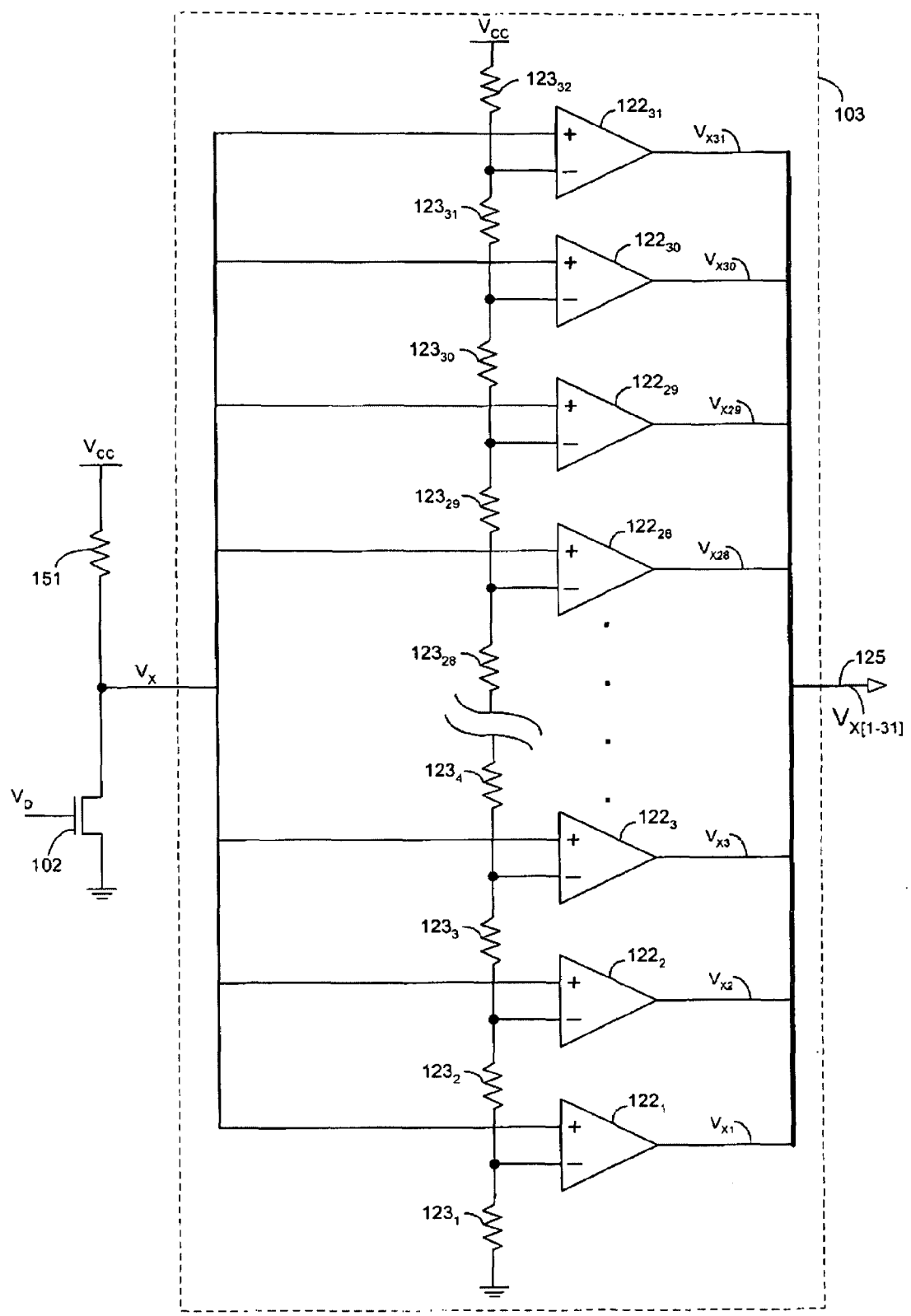
FIG. 3 is a schematic diagram illustrating an embodiment of an analog-to-digital converter for use with an on-chip impedance matching circuit, in accordance with the present invention.

A detailed schematic of an embodiment of analog-to-digital (A-to-D) converter 103 is shown in FIG. 3. Circuit 103 shown in FIG. 3 is merely an example of an A-to-D converter that can be used with the present invention. Other suitable A-to-D converters that are well known in the art may be used instead.

A-to-D converter 103 comprises 31 comparators $122_1$-$122_{31}$ and 32 resistors $123_1$-$123_{32}$. Only 7 comparators 122 and 9 resistors 123 are shown in FIG. 3 to simply the drawing. Voltage signal $V_X$ is coupled to the non-inverting input terminals of each of comparators 122. Resistors $123_{1-31}$ are coupled in series between supply voltage $V_{CC}$ and ground. The inverting input terminals of each of comparators 122 are coupled between two of resistors 123 as shown in FIG. 3. The 31 comparators $122_{1-31}$ generate 31 voltage output signals $V_{X1}$-$V_{X31}$, respectively. The output terminals of comparators 122 are coupled to a bus line 125 that includes 31 signal lines for voltage output signals $V_{X1}$-$V_{X31}$.

Resistors 123 comprise a resistor divider that provides a threshold voltage at the inverting inputs of each of comparators 122. When voltage signal $V_X$ is greater than the threshold voltage of one of comparators 122, the output signal of that comparator is pulled up to $V_{CC}$ (i.e., a logic HIGH). When voltage signal $V_X$ is less than the threshold voltage of one of comparators 122, the output signal of that comparator is pulled to ground (i.e., a logic LOW). Thus, the output signals $V_{X1}$-$V_{X31}$ of comparators 122 comprise 31 HIGH or LOW logic signals.

The resistance of resistors $123_1$ through $123_{32}$ may be selected be any suitable values. As an example, the resistance of resistors $123_1$ through $123_{32}$ can have the following ratios to an arbitrary resistance R: 0.59, 0.52, 0.47, 0.42, 0.38, 0.35, 0.32, 0.29, 0.27, 0.25, 0.23, 0.21, 0.20, 0.18, 0.17, 0.16, 0.15, 0.14, 0.13, 0.13, 0.12, 0.11, 0.11, 0.10, 0.10, 0.09, 0.09, 0.08, 0.08, 0.08, 0.07, and 3.40, for resistors $123_1$ through $123_{32}$, respectively. The total resistance in resistor ladder 123 is 10R in this example. These resistor ratios are merely one example. Other resistor ratios may also be selected to implement the present invention.

The ratios of resistors 123 and voltage signal $V_X$ determine which of output signals $V_{X1}$-$V_{X31}$ are HIGH and which of output signals $V_{X1}$-$V_{X31}$ are LOW. Voltage signal $V_X$ varies when changes in temperature, voltages, and process fabrication techniques cause changes in the $R_{DS}$ resistance of transistor 102 over time and from chip-to-chip. As voltage signal $V_X$ changes, the values of one voltages $V_{X1}$-$V_{X31}$ changes when $V_X$ moves above or below the threshold voltage provided by resistors 123 to the corresponding comparator 122.

The example resistor ratios shown in FIG. 3 may be used as an illustration, as is now discussed. The resistance of all of resistors 123 adds up 10R. Thus, if $V_X$ is greater than $(0.59/10)V_{CC}$ but less than $(0.59+0.52)V_{CC}/10$, then output signal $V_{X1}$ is HIGH, and output signals $V_{X2}$-$V_{X31}$ are LOW. If $V_X$ rises above $(0.59+0.52+0.47)V_{CC}/10$, but is less than $(0.59+0.52+0.47+0.42)V_{CC}/10$, then output signals $V_{X1}$-$V_{X3}$ are HIGH, and output signals $V_{X4}$-$V_{X31}$ are LOW.

Signals $V_{X1}$-$V_{X31}$ are transmitted along bus line 125 to digital encoder 104. Digital encoder 104 converts the fifteen signals $V_{X1}$-$V_{X31}$ on bus line 125 to a five voltage signals $V_{B4}$, $V_{B3}$, $V_{B2}$, $V_{B1}$, $V_{B0}$. The five voltage signals $V_{B4}$, $V_{B3}$, $V_{B2}$, $V_{B1}$, $V_{B0}$ are transmitted on five wires that are part of bus 161. Voltages $V_{B4}$, $V_{B3}$, $V_{B2}$, $V_{B1}$, and $V_{B0}$ represent a five bit binary code referred to as bits BIT4, BIT3, BIT2, BIT1, and BIT0.

Figure 4:
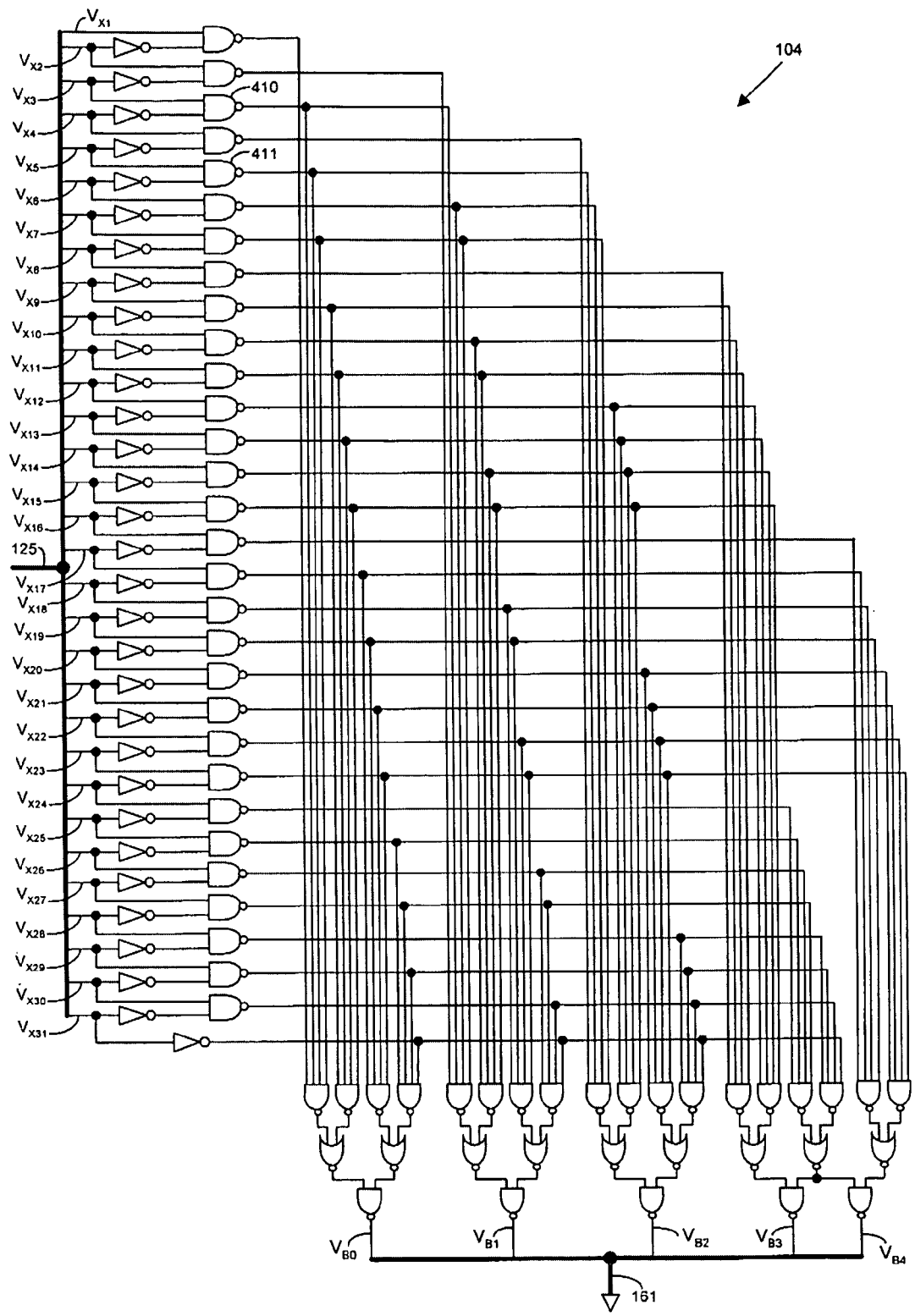
FIG. 4 is a schematic diagram illustrating an embodiment of a digital encoder circuit for use with an on-chip impedance matching circuit, in accordance with the present invention.

An embodiment of digital encoder 104 is shown in FIG. 4. Digital encoder 104 is merely an example of a digital encoder that can be utilized in the present invention. Other digital encoders that convert a plurality of signals to a digital binary code, which are well known in the art, can be used instead.

Digital encoder 104 includes a plurality logic gates including inverters, NOR gates, and NAND gates, which determine the value of the binary code on bus 161. The five bit binary code on bus 161 has 32 different states. 31 of the 32 possible states are indicative of unique values for signals $V_{X1}$-$V_{X31}$. The binary code 0000 is not used, because it would cause all of transistors 106-110 in circuit 150 to be OFF.

As an example, if $V_{X1}$-$V_{X3}$ are HIGH, and $V_{X4}$-$V_{X31}$ are LOW, then the voltages [$V_{B4}$, $V_{B3}$, $V_{B2}$, $V_{B1}$, $V_{B0}$] on bus 161 have a binary value of 00011 for BIT4, BIT3, BIT2, BIT1, BIT0, respectively. When $V_{X3}$ is HIGH and $V_{X4}$ is LOW, the output signal of NAND gate 410 is LOW, causing voltages $V_{B0}$ and $V_{B1}$ to be HIGH. Voltages $V_{B2}$-$V_{B4}$ are LOW.

As another example, if $V_{X1}$-$V_{X5}$ are HIGH, and $V_{X6}$-$V_{X31}$ are LOW, then the four bit code [$V_{B4}$, $V_{B3}$, $V_{B2}$, $V_{B1}$, $V_{B0}$] on signal line 161 is 00101. When $V_{X5}$ is HIGH and $V_{X6}$ is LOW, the output signal of NAND gate 411 is LOW, causing voltages $V_{B0}$ and $V_{B2}$ to be HIGH. Voltages $V_{B1}$, $V_{B3}$, and $V_{B4}$ are LOW.

On-chip impedance matching circuit 150 includes five n-channel field-effect transistors (FETs) 106, 107, 108, 109, and 110 coupled in parallel. The drain terminals of transistors 106-110 are coupled to one I/O pin of the integrated circuit, and the source terminals of transistors 106-110 are coupled to ground.

The gate of transistor 106 is coupled to receive voltage $V_{B4}$ on bus 161. The gate of transistor 107 is coupled to receive signal $V_{B3}$ on bus 161. The gate of transistor 108 is coupled to receive signal $V_{B2}$ on bus 161. The gate of transistor 109 is coupled to receive signal $V_{B1}$ on bus 161. The gate of transistor 110 is coupled to receive signal $V_{B0}$ on bus 161.

An integrated circuit of the present invention preferably comprises a plurality of impedance matching circuits 150. Each of the impedance matching circuits 150 are associated with one of the input/output (I/O) pins on the integrated circuit. An integrated circuit can contain as many (or more) impedance matching circuits 150 as there are I/O pins on the chip. Each of the impedance circuits 150 is associated with one of the I/O pins on the integrated circuit. Only one impedance matching circuit 150 is shown in FIG. 2 to avoid over-complicating the drawing. Bus line 161 can drive multiple the impedance matching circuits on the same integrated circuit.

FIGS. 1A-1C illustrate examples of configurations for impedance matching circuit 150. Impedance matching circuit 150 can be coupled to an I/O pin or to an I/O buffer as shown in FIGS. 1A-1C with respect to the configuration of impedance matching circuits 21, 22, 41, 42, 61, 62, and 63. Transistors 106-110 can be coupled in parallel between an I/O pin and ground, as shown with respect to circuit 22 in FIG. 1A, or between $V_{CC}$ and an I/O pin, as shown with respect to circuits 21 and 63. Alternatively, transistors 106-110 can be coupled between ground or $V_{CC}$ and a buffer circuit that is coupled to an I/O pin, as shown with respect to circuits 41, 42, 61, and 62 in FIGS. 1B-1C.

Field-effect transistors 106-110 have channel width-to-length (W/L) aspect ratios that are sized in proportion to the channel width-to-length (W/L) aspect ratio of field-effect transistor 102. For example, in the embodiment shown in FIG. 2, transistor 106 has a W/L ratio that is equal to the W/L ratio of transistor 102. Transistor 107 has a W/L ratio that is one-half the W/L ratio of transistor 102. Transistor 108 has a W/L ratio that is one-quarter the W/L ratio of transistor 102. Transistor 109 has a W/L ratio that is one-eighth the W/L ratio of transistor 102. Transistor 110 has a W/L ratio that is one-sixteenth the W/L ratio of transistor 102.

The signals $V_{B4}$, $V_{B3}$, $V_{B2}$, $V_{B1}$, and $V_{B0}$ determine whether transistors 106-110, respectively, are ON or OFF. A logic HIGH at the gate of one of n-channel transistors 106-110 causes that transistor to be ON, and a logic LOW at the gate of one of transistors 106-110 causes that transistor to be OFF. The effective W/L ratio of impedance matching circuit 150 is determined by the transistors 106-110 that are ON. Therefore, the binary code represented by signals [$V_{B4}$, $V_{B3}$, $V_{B2}$, $V_{B1}$, $V_{B0}$] determines the effective W/L ratio impedance matching circuit 150.

For example, if signals [$V_{B4}$, $V_{B3}$, $V_{B2}$, $V_{B1}$, $V_{B0}$] represent binary code 10010, then transistors 106 and 109 are ON, and transistors 107-108 and 110 are OFF. In this case, the effective W/L ratio of impedance circuit 150 is 1⅛ times the W/L ratio of transistor 102. If signals [$V_{B4}$, $V_{B3}$, $V_{B2}$, $V_{B1}$, $V_{B0}$] represent binary code 01110, then transistors 107-109 are ON, and transistors 106 and 110 are OFF. In this case, the effective W/L ratio of impedance circuit 150 is ⅛+¼+½=⅞ times the W/L ratio of transistor 102.

The effective W/L ratio of impedance circuit 150 determines the impedance of impedance matching circuit 150. As the effective W/L ratio of transistors 106-110 increases, the impedance of circuit 150 decreases. As the effective W/L ratio of transistors 106-110 decreases, the impedance of circuit 150 increases.

The output signals [$V_{B4}$, $V_{B3}$, $V_{B2}$, $V_{B1}$, $V_{B0}$] of digital encoder 104 vary in response to changes in the $R_{DS}$ ON resistance of transistor 102. The $R_{DS}$ resistance of transistor 102 is sensitive to changes in the temperature of the integrated circuit, supply voltage changes, and process variations. Thus, as the resistance $R_{DS}$ of transistor 102 changes, the voltages $V_{X1}$-$V_{X31}$ and voltages [$V_{B4}$, $V_{B3}$, $V_{B2}$, $V_{B1}$, $V_{B0}$] may also change.

The $R_{DS}$ resistance of transistors 106-110 changes in response to changes in voltages [$V_{B4}$, $V_{B3}$, $V_{B2}$, $V_{B1}$, $V_{B0}$]. The resistance ratios of resistors 123 are selected so that the effective W/L ratio of circuit 150 compensates for changes in the $R_{DS}$ of transistors 106-110 caused by process, temperature, and voltage variations. As the $R_{DS}$ ON resistance of transistor 102 varies with process, temperature, and/or voltage, the effective W/L ratio of impedance matching circuit 150 may also change according to the bit sequence of binary voltages [$V_{B4}$, $V_{B3}$, $V_{B2}$, $V_{B1}$, $V_{B0}$] in order to minimize changes in the impedance of circuit 150.

For example, if the temperature of the integrated circuit increases and the $R_{DS}$ ON resistance of transistor 102 increases with temperature, voltage signal $V_X$ increases.

Signal $V_X$ may eventually increase enough to cause more of output signals $V_{X1}$-$V_{X31}$ go HIGH. The bit sequence of binary signals [$V_{B4}$, $V_{B3}$, $V_{B2}$, $V_{B1}$, $V_{B0}$] also changes causing different ones of transistors 106-110 to be ON or OFF so that the effective W/L ratio of impedance circuit 150 increases.

For example, if the bit sequence of binary voltages [$V_{B4}$, $V_{B3}$, $V_{B2}$, $V_{B1}$, $V_{B0}$] is 10000, transistor 106 is ON and transistors 107-110 are OFF. The impedance of circuit 150 is determined by an effective W/L ratio of 1 times the W/L ratio of transistor 102. If the ON resistance of transistor 102 increases sufficiently such that the bit sequence of binary voltages [$V_{B4}$, $V_{B3}$, $V_{B2}$, $V_{B1}$, $V_{B0}$] changes to 10011, transistors 106, 109, and 110 are ON and transistors 107-108 are OFF. The effective impedance of circuit 150 is now determined by an effective W/L ratio of $1+1\frac{1}{8}+\frac{1}{16}=\frac{19}{16}$ times the W/L ratio of transistor 102.

Therefore, the effective channel W/L ratio of impedance circuit 150 is proportional to the $R_{DS}$ ON resistance of transistor 102. This relationship is designed to compensate for variations in the $R_{DS}$ resistance of transistors 106-110 to minimize changes in the matching impedance provided by circuit 150. For example, process, temperature, and/or voltage variations that cause the $R_{DS}$ resistance of transistor 102 to increase, also cause the $R_{DS}$ resistance of transistors 106-110 to increase. In response to a sufficient increase in the resistance of transistor 102, A-to-D converter 103 and encoder 104 causes the effective channel W/L ratio of impedance matching circuit 150 to increase in order to maintain the impedance of circuit 150 substantially constant.

When temperature, process, and/or voltage variations cause the $R_{DS}$ resistance of transistor 102 to decrease, the $R_{DS}$ resistance of transistors 106-110 also decreases. In response to a sufficient decrease in the resistance of transistor 102, A-to-D converter 103 and encoder 104 cause the effective channel W/L ratio of circuit 150 to decrease in order to maintain the effective impedance of circuit 150 substantially constant.

Thus, the impedance of impedance matching circuit 150 at each I/O pin is substantially less sensitive to variations in temperature, voltages, and processes. This advantage is achieved without having to connect external off-chip impedance matching resistors at each of the I/O pins on the integrated circuit. Only a single off-chip resistor 151 (or alternatively, a small number of off-chip resistors) is connected to the integrated circuit to achieve impedance matching for multiple I/O pins that is less sensitive to process, temperature, and voltage variations. The techniques of the present invention therefore provide impedance matching while using substantially less board space than prior art techniques that require connecting an off-chip resistor to each I/O pin.

In a further embodiment of the present invention, an impedance matching circuit may include more or less than the five transistors 106-110 shown in FIG. 2. For example, an impedance matching circuit may include six transistors coupled in parallel that have channel W/L ratios that are 1, ½, ¼, ⅛, ¹⁄₁₆, and ¹⁄₃₂ times the channel W/L ratio of transistor 102, respectively. As another example, an impedance matching circuit may include four transistors coupled in parallel that have channel W/L ratios that are 1, ½, ¼, and ⅛ times the channel W/L ratio of transistor 102. In another embodiment, the W/L ratios of transistors 106-110 are 2, 1, ½, ¼, and ⅛ times the channel W/L ratio of transistor 102, respectively.

In another embodiment of the present invention, a switch circuit is provided between the fifth binary signal that drives the gate of transistor 110. The switch circuit enables or disables transistor 110 for certain I/O pins in response to user input, at specified times, or under certain operating conditions.

Adding a fifth transistor 110 that has ¹⁄₁₆ times the W/L ratio of transistor 102 provides added impedance matching resolution. Having a transistor 106 that has 2 times the W/L ratio of transistor 102 provides a wider range of impedance matching (i.e., between ⅛ and 3⅞ W/L ratio). As another example, an impedance matching circuit may contain only three transistors coupled in parallel with W/L ratios such as 1, ⅔, and ⅓, or 1, ½, and ¼ times the W/L ratio of transistor 102.

In a further embodiment, the I/O pins on an integrated circuit may be coupled to impedance matching circuits that have different numbers of transistors. For example, one I/O pin may have an impedance matching circuit that has five transistors coupled in parallel, while the other I/O pins on the integrated circuit each have an impedance matching circuit with only four transistors coupled in parallel. In still further embodiments, field-effect transistors 102, and 106-110 can be substituted with bipolar junction transistors. In still a further embodiment, the digital encoder may be eliminated so that an analog-to-digital converter provides output signals directly to the impedance matching circuits.

Figure 5:
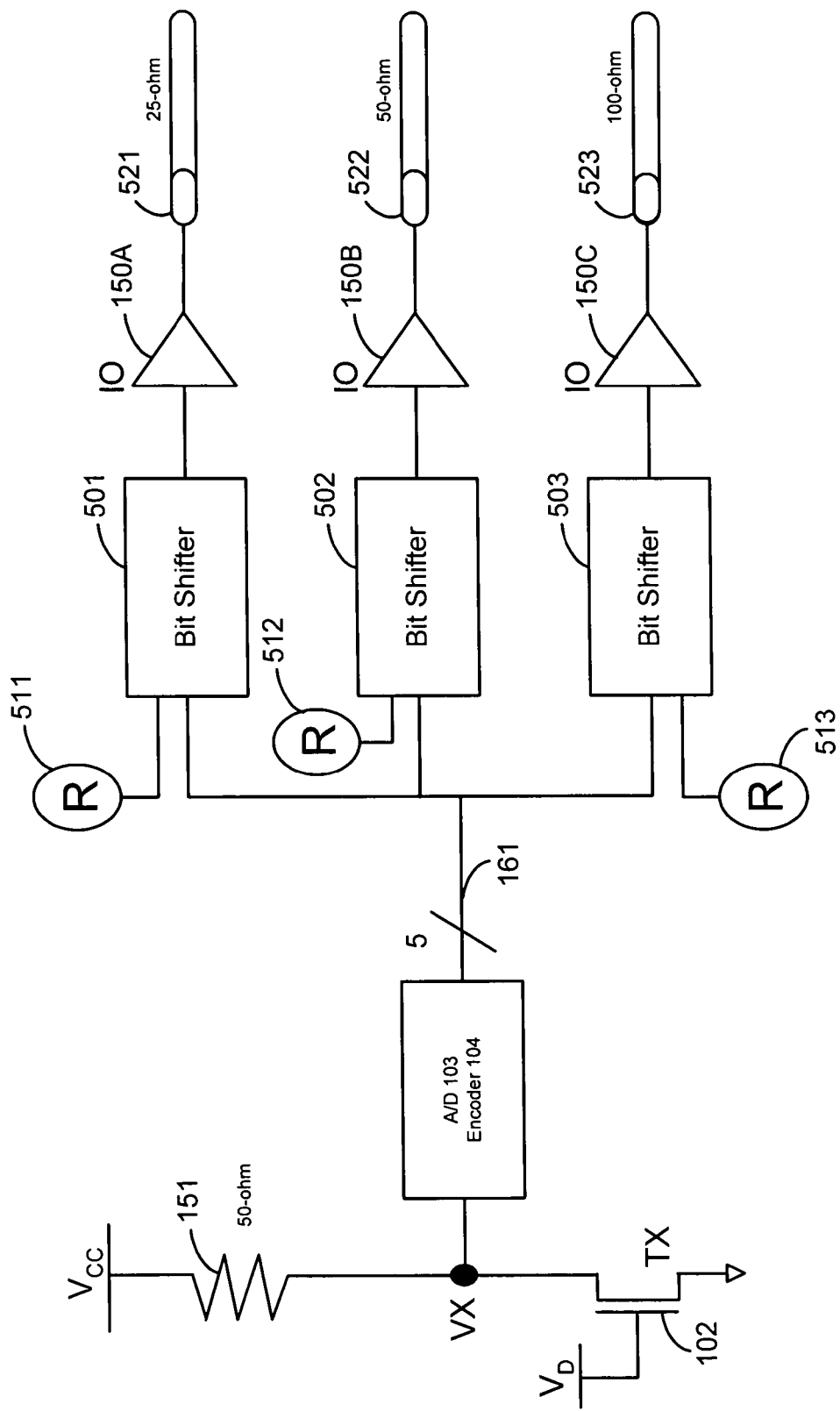
FIG. 5 is a diagram illustrating bit shifter circuits coupled to the circuitry of FIG. 2 according to an embodiment of the present invention.

FIG. 5 illustrates an embodiment of the present invention that includes bit shifter circuits 501, 502, and 503. In the embodiment of FIG. 5, each of bit shifter circuit 501-503 are coupled in parallel between encoder 104 and one of on-chip termination impedance circuits 150A-150C. Each of termination impedance circuits 150A-150C contains five on-chip transistors 106-110 as shown in FIG. 2.

An adjustable on-chip impedance termination circuit with five transistors is merely one embodiment of the present invention. Five transistors are shown and discussed herein as one example and are not intended to limit the scope of the present invention. Any suitable number of transistors coupled in parallel can be used in each of the termination impedance circuits 150A-150C (e.g., 3, 4, 6, etc.).

Bit shifter circuits 501-503 receive the five output voltages [$V_{B4}$, $V_{B3}$, $V_{B2}$, $V_{B1}$, $V_{B0}$] from digital encoder circuit 104. Voltages $V_{B4}$, $V_{B3}$, $V_{B2}$, $V_{B1}$, and $V_{B0}$ are referred to as BIT4, BIT3, BIT2, BIT1, and BIT0, respectively, in FIG. 6A. Circuits 501-503 can shift bits BIT0-BIT4 to the right or to the left in response to the state of RAM bits stored in RAM cells 511-513, respectively.

By shifting bits BIT0-BIT4 to the right or to the left, circuits 501-503 change the termination impedance at I/O pins 521-523, respectively. For example, digital encoder circuit 104 can generate 01101 for bits BIT4-BIT0, respectively. With a bit pattern of 01101, transistors 107-108 and 110 are ON, and transistors 106 and 109 are OFF in circuit 150. The total transistor W/L ratio of the termination circuit is $\frac{1}{2}x+\frac{1}{4}x+\frac{1}{16}(x)=\frac{13}{16}$.

Bit shifters 501-503 can shift the bit pattern 01101 to the left by 1-bit to change the bit pattern to 11010. By left shifting, the least significant bit becomes 0. With a bit pattern of 11010 for BIT4-BIT0, transistors 106-107 and 109 are ON, and transistors 108 and 110 are OFF in circuit 150. The total transistor W/L ratio is now $1x+\frac{1}{2}x+\frac{1}{4}x=1\frac{3}{8}$. Thus, left shifting the bit pattern by 1-bit causes the total W/L ratio of circuit 150 to increase by 2 (or about 2 in other examples), and the total output impedance of circuit 150 to decrease by one-half (or about ½), provided that the most significant bit is 0.

Bit shifters 501-503 can also shift the bit pattern 01101 to the right by 1-bit to change the bit pattern to 00110. By right shifting, the most significant bit becomes 0. With a bit pattern of 00110 for BIT4-BIT0, transistors 108 and 109 are ON, and transistors 106-107 and 110 are OFF in circuit 150. The total transistor W/L ratio is now ¼x+⅛(x)=⅜. Thus, right shifting the bit pattern by 1-bit causes the total W/L ratio of circuit 150 to decrease by about ½, and the total output impedance of circuit 150 to increase by about 2.

Figure 6A:
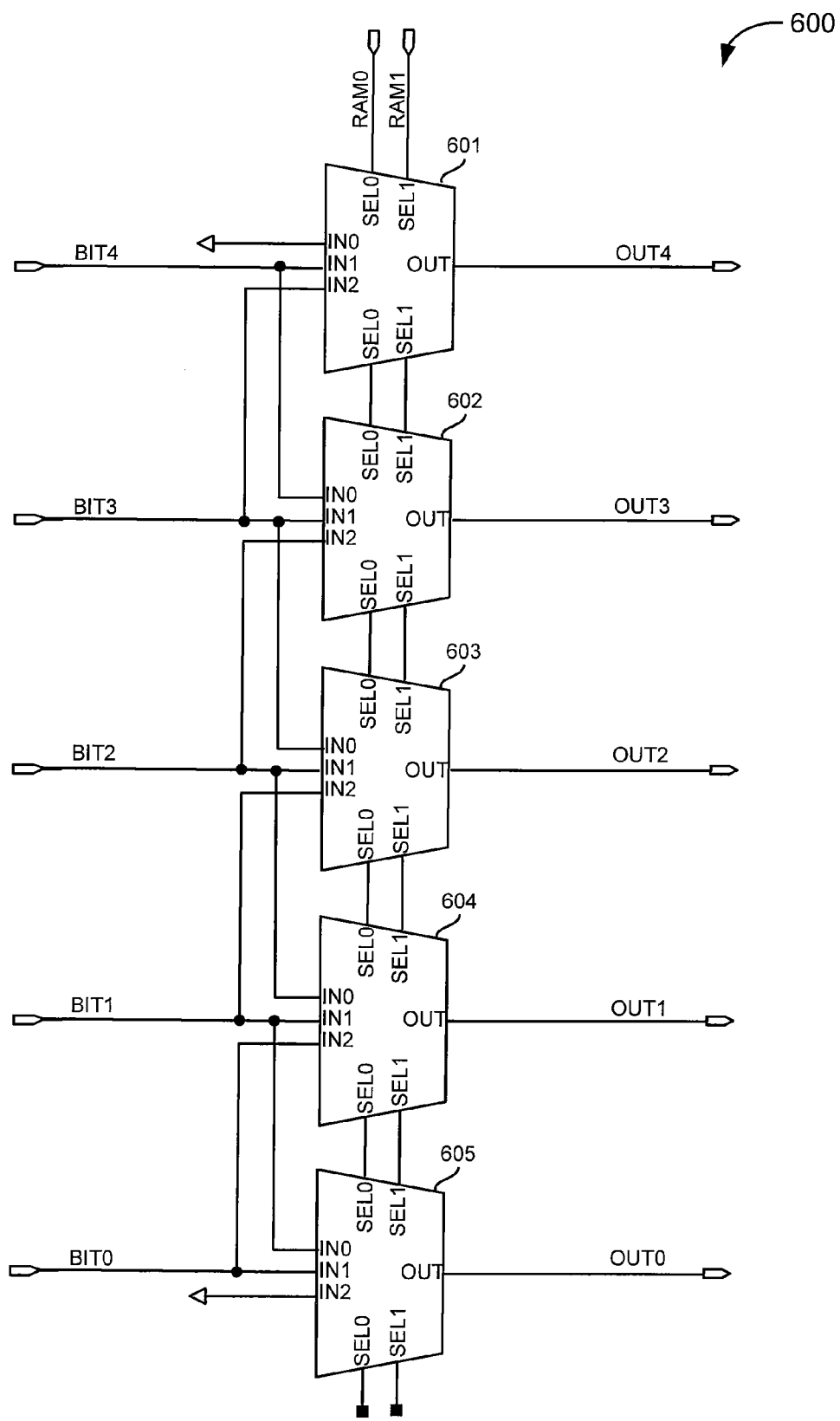
FIGS. 6A and 6B illustrate examples of bit shifter circuits with five multiplexers according to embodiments of the present invention.

FIG. 6A illustrates an example of circuitry 600 that can be used to implement each of bit shifters 501-503. Circuit 600 includes multiplexers 601-605. In general circuit 600 has the same number of multiplexers as there are bits generated by encoder 104. Thus, if encoder 104 generates a four bit signal, then circuit 600 has four multiplexers.

Each of multiplexers 601-605 receives two or three adjacent bits from bit signals BIT4-BIT0. Specifically, multiplexer 601 receives BIT4 and BIT3 at two of its input terminals. The third input terminal of multiplexer 601 is coupled to ground. Multiplexer 602 receives BIT4, BIT3, and BIT2 at its three input terminals. Multiplexer 603 receives BIT3, BIT2, and BIT1 at its three input terminals. Multiplexer 604 receives BIT2, BIT1, and BIT0 at its three input terminals. Multiplexer 605 receives BIT1 and BIT0 at two of its input terminals and ground at its third input terminals.

Multiplexers 601-605 each receive RAM bits RAM0 and RAM1 at its select inputs SEL0 and SEL1, respectively. Each of multiplexers 601-605 couples one of the bit signals at its input terminals (or ground) to output terminal OUT in response to the states of RAM bits RAM0 and RAM1.

Figure 7:
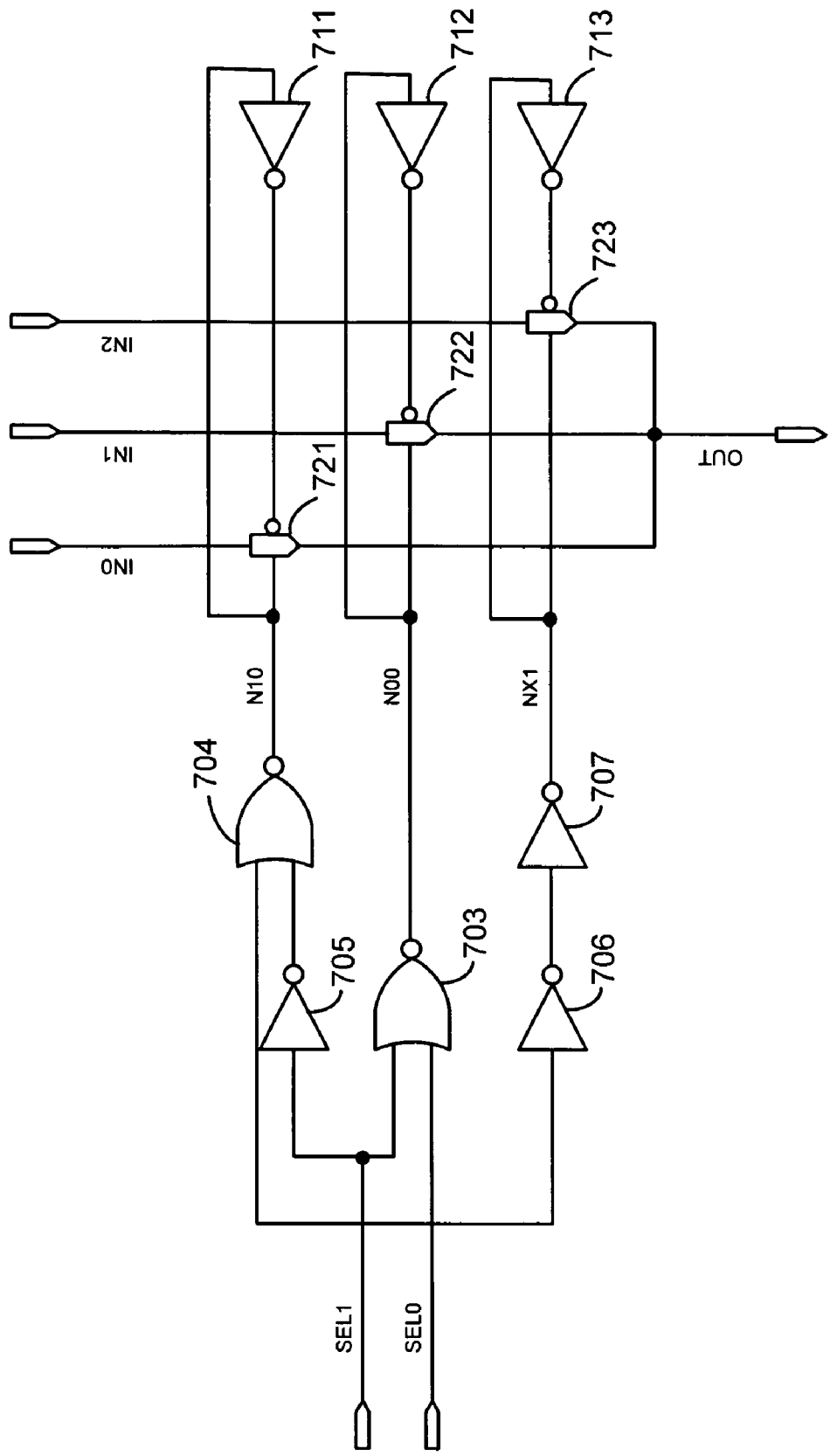
FIG. 7 illustrates an example of the multiplexers that can be used with the bit shifter circuits of FIGS. 6A and 6B according to an embodiment of the present invention.

FIG. 7 illustrates a block diagram of a multiplexer. The multiplexer of FIG. 7 is an example of each multiplexer 601-605. The FIG. 7 multiplexer includes inverters 705-707, NOR gates 703-704, and inverters 711-713. The multiplexer also includes transmission gates 721-723. The multiplexer couples one of its input terminals IN0, IN1 or IN2 to output terminal OUT in response to RAM bits RAM0 and RAM1 at select inputs SEL0 and SEL1, respectively.

When RAM0 is 0 (LOW) and RAM1 is 0 (LOW), transmission gate 722 couples IN1 to OUT, and transmission gates 721 and 723 decouple IN0 and IN2 from OUT in multiplexers 601-605. Because multiplexers 601-605 each receive RAM0 and RAM1, bits BIT4-BIT0 are transmitted directly to OUT4-OUT0. No bit shifting takes place, and all of bits BIT4-BIT0 are transmitted to termination transistors 106-110. In one embodiment, the termination impedance of circuit 150 equals (or approximately equals) the resistance of off-chip resistor 151, when no bit shifting takes place.

When RAM0 is 0 and RAM1 is 1, transmission gate 721 couples IN0 to OUT, and transmission gates 722-723 decouple IN1 and IN2 from OUT in multiplexers 601-605. Multiplexer 602 transmits BIT4 to OUT3, multiplexer 603 transmits BIT3 to OUT2, multiplexer 604 transmits BIT2 to OUT1, and multiplexer 605 transmits BIT1 to OUT0. Also, multiplexer 601 couples OUT4 to ground through its IN0 terminal. Thus, when RAM0=0 and RAM1=1, bits BIT4-BIT0 are right shifted by one bit, and the impedance of circuit 150 increases.

When RAM0 is 1 (regardless of the state of RAM1), transmission gate 723 couples terminal IN2 to OUT, and transmission gates 721-722 decouple IN0 and IN1 from OUT in multiplexers 601-605. Multiplexer 601 transmits BIT3 to OUT4, multiplexer 602 transmits BIT2 to OUT3, multiplexer 603 transmits BIT1 to OUT2, and multiplexer 604 transmits BIT0 to OUT1. Multiplexer 605 couples OUT0 to ground. Thus, when RAM0=1, bits BIT4-BIT0 are left shifted by one bit, and the impedance of circuit 150 decreases.

By allowing the digital output signals of the digital encoder circuit to be right shifted or left shifted, a user can match the impedance of any termination impedance circuit 150 on an integrated circuit (IC) to the characteristic impedance of a corresponding transmission line. The impedance of each on-chip termination circuit 150 can be different than the impedance of other on-chip termination circuits 150 on the IC.

The impedance of each circuit 150 can be set independently based on the values stored in memory cells such as 511-513. Therefore, the present invention provides on-chip impedance termination that can be set to match different characteristic impedance values of transmission lines coupled to pins on an IC.

Referring again to FIG. 5, bit shifter circuits 501-503 are coupled to termination impedance circuits 150A-150C, respectively. Circuits 150A-150C each have five parallel termination transistors 106-110, which are shown in FIG. 2. Circuit 150A provides termination impedance to I/O pin 521. Circuit 150B provides termination impedance to I/O pin 522. Circuit 150C provides termination impedance to I/O pin 523.

Bit shifter 501 receives RAM bits RAM0 and RAM1 from memory 511. Bit shifter 502 receives RAM bits RAM0 and RAM1 from memory 512. Bit shifter 503 receives RAM bits RAM0 and RAM1 from memory 513.

Memories 511-513 can be loaded with different values for bits RAM0 and RAM1 in order to program circuits 150A-150C with different impedance values. For example, a user can program memory 511 so that RAM0=1. With RAM0 at 1, bit shifter circuit 501 left shifts bits BIT4-BIT0 by one bit to decrease the impedance of circuit 150A to 25 ohms as shown in FIG. 5. The impedance of external resistor 151 in this example is 50 ohms.

As another example, a user can program memory 512 so that RAM0=0 and RAM1=0. In response, bit shifter 502 does not right shift or left shift bits BIT4-BIT0. Therefore, the impedance of circuit 150B is 50 ohms as shown in FIG. 5 (the same as resistor 151).

As still another example, a user can program memory 513 so that RAM0=0 and RAM1=1. In response, bit shifter 503 right shifts bits BIT4-BIT0 by one bit to increase the impedance of circuit 150C to 100 ohms as shown in FIG. 5.

These three examples show that the techniques of the present invention can provide different termination impedance values to different I/O pins on the same integrated circuit by bit shifting the output bits of digital encoder 104. Each termination impedance circuit 150A-150C can provide termination impedance to two or more I/O pins.

In FIG. 5, different impedance values are provides to three different pins. The techniques of the present invention can also be used to provide 2, 4, 5, 6, or more different termination impedance values to any number of I/O pins on an integrated circuit. Each termination impedance circuit 150 provides one termination impedance value at a time. The termination impedance value provided to any one pin can be changed by bit-shifting the output bits of the digital encoder.

Figure 6B:
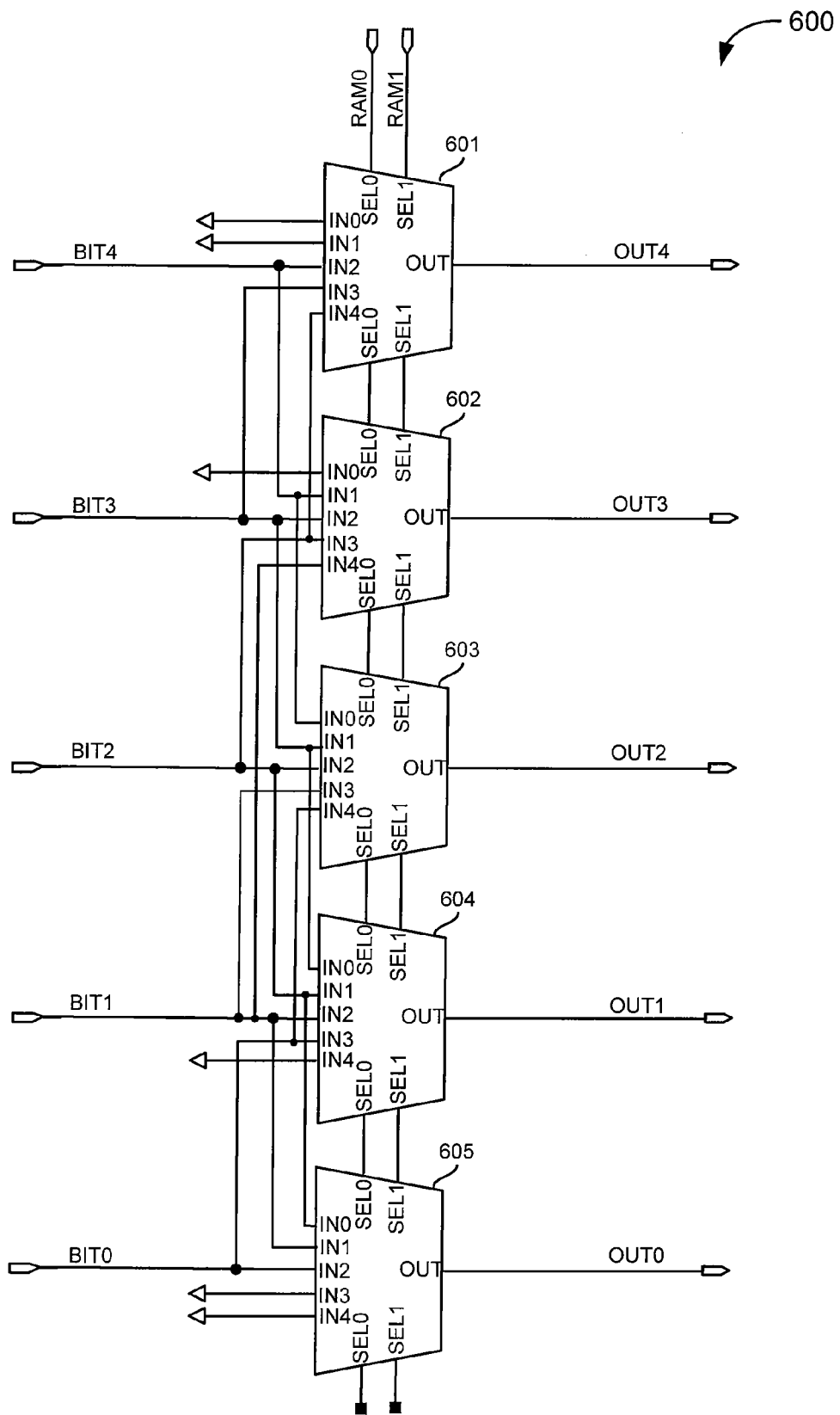

According to further embodiments, a bit shifter circuit of the present invention can shift bits BIT4-BIT0 to the left or to the right by two or more bits to increase/decrease the on-chip termination impedance by a larger amount. In an embodiment that can shift left or right by two bits, each multiplexer in the bit shifter circuit has five input terminals, four of which are coupled to adjacent bit signals or ground. A 2-bit shifter allows a user to match 0.25R. 0.5R, R, 2R, and 4R, where R is the matching resistance when the bit shifter does not shift any of the bits. An example of one such bit shifter circuit is shown in FIG. 6B.

According to still further embodiments of the present invention, encoder circuit 104 generates a bit signal that has less than or greater than 5 bits. The number of parallel termination impedance transistors equals the number of bit signals generated by the encoder circuit, because the gate of each termination transistor is coupled to one of the bit signals. Also, the number of parallel multiplexers in the bit shifter circuit equals the number of bit signals generated by the digital encoder.

Figure 8:
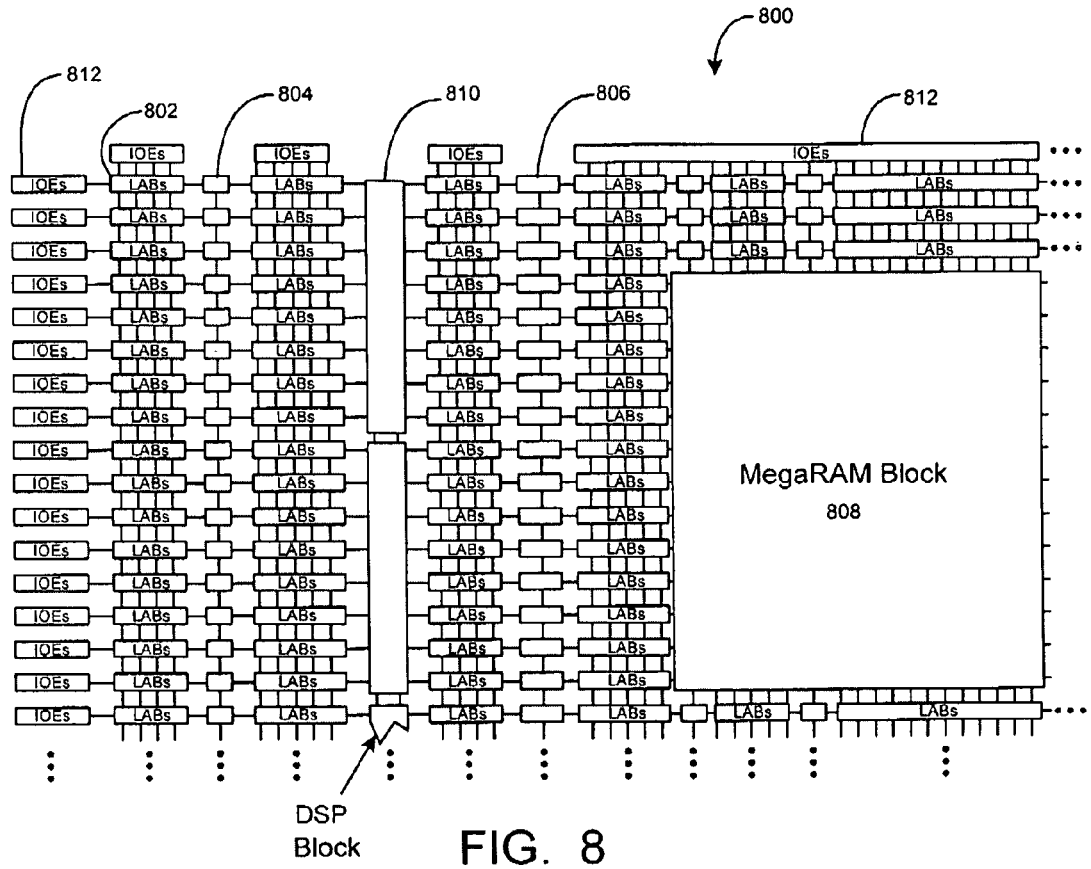
FIG. 8 is a simplified block diagram of a programmable logic device that can be used with technology mapping techniques of the present invention.

The impedance termination techniques of the present invention can be used with application specific integrated circuits (ASICs) and programmable integrated circuits such as FPGAs and PLDs. FIG. 8 is a simplified partial block diagram of an exemplary high-density PLD 800 that can implement the techniques of the present invention. PLD 800 includes a two-dimensional array of programmable logic array blocks (or LABs) 802 that are interconnected by a network of column and row interconnects of varying length and speed. LABs 802 include multiple (e.g., 10) logic elements (or LEs), an LE being a small unit of logic that provides for efficient implementation of user defined logic functions.

PLD 800 also includes a distributed memory structure including RAM blocks of varying sizes provided throughout the array. The RAM blocks include, for example, 512 bit blocks 804, 4K blocks 806 and a MegaBlock 808 providing 512K bits of RAM. These memory blocks can also include shift registers and FIFO buffers. PLD 800 further includes digital signal processing (DSP) blocks 810 that can implement, for example, multipliers with add or subtract features. I/O elements (IOEs) 812 located, in this example, around the periphery of the device support numerous single-ended and differential I/O standards. It is to be understood that PLD 800 is described herein for illustrative purposes only and that the present invention can be implemented in many different types of PLDs, FPGAs, and the like.

Figure 9:
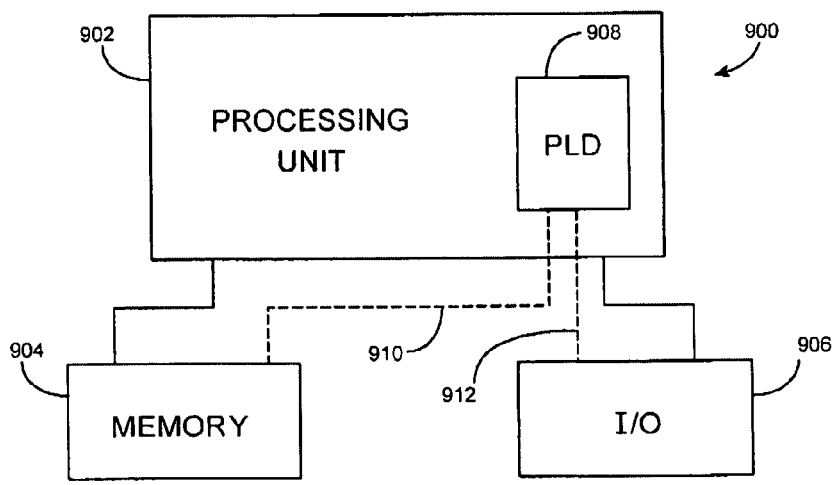
FIG. 9 is a block diagram of an electronic system that can implement embodiments of the present invention.

While PLDs of the type shown in FIG. 8 provide many of the resources required to implement system level solutions, the present invention can also benefit systems wherein a PLD is one of several components. FIG. 9 shows a block diagram of an exemplary digital system 900, within which the present invention can be embodied. System 900 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 900 can be provided on a single board, on multiple boards, or within multiple enclosures.

System 900 includes a processing unit 902, a memory unit 904 and an I/O unit 906 interconnected together by one or more buses. According to this exemplary embodiment, a programmable logic device (PLD) 908 is embedded in processing unit 902. PLD 908 can serve many different purposes within the system in FIG. 4. PLD 908 can, for example, be a logical building block of processing unit 902, supporting its internal and external operations. PLD 908 is programmed to implement the logical functions necessary to carry on its particular role in system operation. PLD 908 can be specially coupled to memory 904 through connection 910 and to I/O unit 906 through connection 912.

Processing unit 902 can direct data to an appropriate system component for processing or storage, execute a program stored in memory 904 or receive and transmit data via I/O unit 906, or other similar function. Processing unit 902 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLDs 908 can control the logical operations of the system. In an embodiment, PLD 908 acts as a reconfigurable processor, which can be reprogrammed as needed to handle a particular computing task. Alternately, programmable logic device 908 can itself include an embedded microprocessor. Memory unit 904 can be a random access memory (RAM), read only memory (ROM), fixed or flexible disk media, PC Card flash disk memory, tape, or any other storage means, or any combination of these storage means.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. An integrated circuit comprising:
   a digital encoder circuit coupled to receive an analog signal indicative of an impedance of an off-chip resistor, the digital encoder circuit generating a plurality of digital signals;
   a first bit shifter circuit comprising first multiplexers that receive the digital signals, wherein the first multiplexers shift the digital signals to the left in response to a first bit shift signal and to the right in response to a second bit shift signal; and
   a first impedance termination circuit comprising first transistors coupled in parallel and that are each coupled to receive an output signal of one of the first multiplexers, each of the first transistors being coupled to a first pin of the integrated circuit,
   wherein the first multiplexers shift the digital signals to the left by two bits in response to a third bit shift signal and to the right by two bits in response to a fourth bit shift signal.

2. The integrated circuit as defined in claim 1 further comprising:
   logic array blocks, each including a plurality of logic elements that are configurable to implement logic functions; and
   a programmable interconnect structure connecting the logic array blocks.

3. The integrated circuit as defined in claim 1 wherein the first impedance termination circuit is coupled to provide parallel termination impedance to the first pin.

4. The integrated circuit as defined in claim 1 wherein the first impedance termination circuit is coupled to provide series termination impedance to the first pin.

5. The integrated circuit as defined in claim 1 wherein an impedance of the first impedance termination circuit decreases by about ½ in response to the first bit shift signal, and the impedance of the first impedance termination circuit increases by about 2 in response to the second bit shift signal.

6. The integrated circuit as defined in claim 1 wherein the first impedance termination circuit includes five transistors coupled in parallel, the digital encoder circuit generates five digital signals, and the first multiplexers include five multiplexers.

7. The integrated circuit as defined in claim 1 wherein the first multiplexers receive n digital signals from the digital encoder circuit and pass each of the n digital signals from the digital encoder circuit to the first transistors without bit shifting the n digital signals in response to a bypass signal.

8. The integrated circuit as defined in claim 1 further comprising:
a second on-chip transistor coupled to the off-chip resistor; and
an analog-to-digital converter coupled to the first transistor and generating the analog signal.

9. A method for providing termination impedance to a pin on an integrated circuit, the method comprising
generating digital signals in response to a signal indicative of an impedance of an off-chip resistor;
shifting the digital signals by at least one bit to generate bit shifted signals; and
setting a total impedance of first transistors using the bit shifted signals, the first transistors being coupled in parallel and to a first pin on the integrated circuit, each of the first transistors being coupled to receive one of the bit shifted signals,
wherein, the shifting of the digital signals includes passing all of the digital signals through multiplexers to generate the bit shifted signals, and
wherein shifting the digital signals by at least one bit to generate bit shifted signals further comprises:
shifting the digital signals by two bits to generate the bit shifted signals.

10. The method according to claim 9 further comprising:
shifting the digital signals by at least one bit to generate second bit shifted signals; and
setting a total impedance of second transistors using the second bit shifted signals, the second transistors being coupled in parallel, each of the second transistors being coupled to a second pin on the integrated circuit and to one of the second bit shifted signals.

11. The method according to claim 10 wherein the first transistors are coupled to provide parallel termination impedance to the first pin; and the second transistors are coupled to provide series termination impedance to the second pin.

12. The method according to claim 9 further comprising:
generating the signal indicative of the impedance of the off-chip resistor using an analog-to-digital converter circuit coupled to the off-chip resistors and an on-chip transistor.

13. An integrated circuit comprising:
a first pin coupled to connect to a resistor that is external to the integrated circuit;
a first current source biased by a bias voltage and coupled to the first pin;
an analog-to-digital converter coupled to the first pin, the analog-to-digital converter providing one less than two to the power of N outputs;
an encoder coupled to receive the one less than two to the power of N outputs from the analog-to-digital converter and to provide N outputs; and a first plurality of transistors forming a first termination impedance, each coupled to one of the N outputs from the encoder.

14. The integrated circuit of claim 13 wherein the bias voltage compensates for changes in processing, supply voltage, and temperature.

15. The integrated circuit of claim 13 further comprising a first logic circuit coupled between the encoder and the first plurality of transistors.

16. The integrated circuit of claim 15 further comprising a second logic circuit coupled between the encoder and a second plurality of transistors forming a second termination impedance, wherein the first and second logic circuits can independently right shift, left shift, or not shift the N outputs from the encoder before providing them to the first and second termination impedances.

17. The integrated circuit of claim 15 wherein the output signals from the encoder are binarily weighted.

18. The integrated circuit of claim 15 wherein the first logic circuit can right shift the output signals before providing them to the output transistors, can left shift the output signals before providing them to the output transistors, or not shift the output signals before providing them to the plurality of transistors.

19. An integrated circuit comprising:
a control circuit coupled to receive a voltage from a reference resistor and to provide a first plurality of control signals;
a first on-chip termination impedance circuit comprising a first plurality of parallel transistors coupled to a first pad;
a first bit-shifter circuit coupled to adjust the termination impedance of the first on-chip termination impedance circuit by providing the first plurality of control signals to the first on-chip impedance circuit, wherein the first plurality of control signals can be right shifted, left shifted, or not shifted before being provided to the first on-chip termination impedance circuit;
a second on-chip termination impedance circuit comprising a second plurality of parallel transistors coupled to a second pad; and
a second bit-shifter circuit coupled to adjust the termination impedance of the second on-chip termination impedance circuit by providing the first plurality of control signals to the second on-chip impedance circuit, wherein the first plurality of control signals can be right shifted, left shifted, or not shifted before being provided to the second on-chip termination impedance circuit.

20. The integrated circuit of claim 19 wherein the first on-chip termination impedance circuit comprises a plurality of transistors, each having a drain coupled to the first pad, and the second on-chip termination impedance comprises a plurality of transistors, each having a drain coupled to the second pad.

21. The integrated circuit of claim 19 wherein the first on-chip termination impedance circuit is coupled to a source of an output driver transistor, wherein a drain of the output driver transistor is coupled to the first pad.

22. The integrated circuit of claim 19 wherein the first plurality of control signals are right shifted, left shifted, or not shifted by the first bit shifter circuit independently of whether the first plurality of control signals are right shifted, left shifted, or not shifted by the second bit shifter circuit.

* * * * *